United States Patent [19]
Rohan

[11] Patent Number: 5,359,524
[45] Date of Patent: Oct. 25, 1994

[54] METHOD AND SYSTEM FOR DETERMINING AN AVERAGE BATCH SIZE

[76] Inventor: Darius Rohan, 7255 Fernmeadow Dr., Dallas, Tex. 75248

[21] Appl. No.: 906,155
[22] Filed: Jun. 29, 1992
[51] Int. Cl.$^5$ ............................................. G06F 15/46
[52] U.S. Cl. .................... 364/468; 364/401
[58] Field of Search ................ 364/468, 478, 401–403, 364/148–150, 152–156, 184

[56] References Cited

U.S. PATENT DOCUMENTS

| | | | |
|---|---|---|---|
| 4,318,177 | 3/1982 | Rapp et al. | 364/468 |
| 5,148,370 | 4/1992 | Litt et al. | 364/468 |
| 5,195,041 | 3/1993 | George et al. | 364/468 |
| 5,233,533 | 8/1993 | Edstrom et al. | 364/401 |

*Primary Examiner*—Jerry Smith
*Assistant Examiner*—Thomas E. Brown
*Attorney, Agent, or Firm*—Robert L. Troike; Richard L. Donaldson

[57] ABSTRACT

The present invention includes processing circuitry (11) interfacing with a multi-process environment (10) for performing a method of determining an average batch size. A processor (12) receives input parameters corresponding to characteristics of the multi-process environment (10) from interfacing circuitry (18). These input parameters generate a first utilization factor which generates a first estimate of the average batch size during a first iteration step. A second utilization factor and in turn a second estimate of the average batch size are generated during a second iteration step. A final estimate of the average batch size can be obtained by either taking a simple average of the first and second estimates of the average batch size, finding the intersection of a straight line and a curve formed by using the first and second utilization factors and the first and second estimates of the average batch size, or continue performing successive iterations until a desired final estimate of the average batch size is obtained. Upon generation of the final estimate of the average batch size, storage circuitry (14) stores the result and display circuitry (16) displays the result for the user. The processing circuitry (11) can reconfigure the multi-process environment (10) for equipment optimization based on the final estimate of the average batch size through the interfacing circuitry (18).

18 Claims, 1 Drawing Sheet

METHOD AND SYSTEM FOR DETERMINING AN AVERAGE BATCH SIZE

TECHNICAL FIELD OF THE INVENTION

This invention relates in general to manufacturing processes and in particular to a method and system for determining an average batch size.

BACKGROUND OF THE INVENTION

In manufacturing and assembly line environments, multiple manufacturing processes can be performed on any one machine belonging to a group of similar machines. For example, in wafer fabrication, simultaneously manufacturing of products occur according to over a thousand processes having over a hundred steps each. Typical processes in wafer fabrication include substrate growth, wafer slicing, epitaxial growth, masking, etching, and diffusion. Each process is performed on several materials at the same time and the process time for any one process remains the same regardless of the machine used or the amount of materials loaded into the machine. The maximum number of materials that may be loaded into a machine in any one process is known as the maximum batch size and each process has its own corresponding maximum batch size. The maximum batch size may differ from process to process. When a machine becomes available for use, a process begins and as many materials as possible are loaded into the machine for processing. The amount of materials loaded into the machine for the process run will either be the maximum batch size for that process or the available material on hand, whichever is less. The average number of materials loaded into a machine over several process runs lies between the maximum batch size and the available material on hand. The average number of materials per process run is called the average batch size of a machine load and is a critical variable in the allocation and configuration of manufacturing resources and machine optimization.

The average batch size of a machine load is usually determined by running a simulation of the manufacturing environment. Such a simulation run requires a complete simulated set up of the manufacturing environment and simulated operation of the machinery over a set period of time, usually through computer processing. Simulating the manufacturing environment is a long and difficult procedure for it may entail thousands of processes, hundreds of process steps, and over one hundred thousand parameters and is thus not readily responsive to changes within the environment. It is desirable to have a method and system for determining the average batch size of a machine load in order to avoid the difficulty and time consuming problems of setting up the simulation of the manufacturing environment and to respond to changes within the manufacturing environment.

From the foregoing, it may be appreciated that a need has arisen to provide a method and system that determine the average batch size of a machine load in a more efficient, simpler, and faster manner than previous simulation techniques. A need has also arisen to provide a method and system for determining the average batch size in order to effectively allocate resources, identify bottlenecks, and optimize manufacturing equipment. Further, a need has arisen to provide a method and system for determining the average batch size which is responsive to changes within the manufacturing environment.

SUMMARY OF THE INVENTION

In accordance with the present invention, a method and system of determining the average batch size of a machine load are provided that substantially eliminate or reduce disadvantages and problems associated with prior art simulation of the manufacturing environment.

The present invention includes interfacing with the multi-process environment to determine input parameters corresponding to characteristics of the multi-process environment. These parameters are provided to processing circuitry for interpolating the average batch size. A first utilization factor is determined from the input parameters. This first utilization factor is used to ascertain a first estimate of the average batch size. A second utilization factor is determined from the first estimate of the average batch size and is used to ascertain a second estimate of the average batch size.

In one embodiment, an average of the two estimates is taken to obtain a final estimate of the average batch size. In a second embodiment, the two estimates and the two utilization factors form a straight line and a curve wherein the intersection of the straight line and the curve identifies the final estimate of the average batch size. In a third embodiment, continued iterative steps calculate subsequent utilization factors and subsequent estimates of the average batch size until a difference between two successive estimates reaches a threshold value identifying a final estimate of the average batch size.

The method and system of the present invention have various technical advantages over simulation techniques within the prior art. For example, one technical advantage is to provide an average batch size of a machine load without simulating the manufacturing environment. Another technical advantage is to provide an average batch size of a machine load in response to changes in the manufacturing environment. Yet another technical advantage is to provide an average batch size of a machine load in an efficient, simpler, and faster manner. Still another technical advantage is to provide a quick and effective method and system for determining an average batch size of a machine load in order to allocate resources, identify bottlenecks, and optimize manufacturing equipment. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
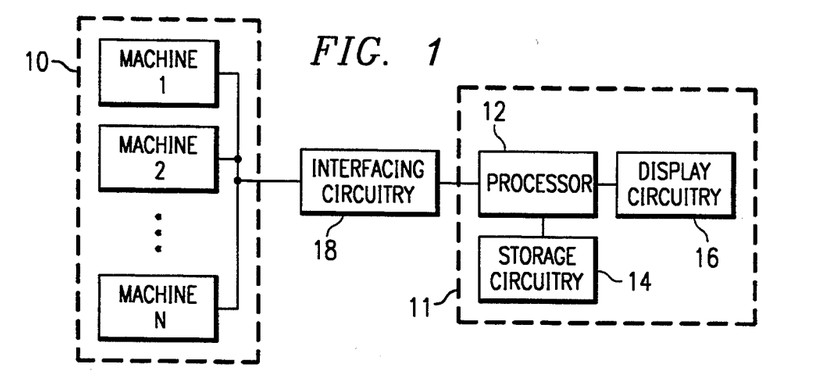
FIG. 1 is a block diagram of a multi-process environment and processing circuitry that performs the method of determining average batch size of a machine load.

FIG. 1 illustrates a block diagram of a multi-process environment 10 and processing circuitry 11 of the preferred embodiment. Multi-process environment 10 comprises a plurality of machines, each machine capable of performing a multitude of processes in the manufacture or fabrication of a product. For example, in wafer fabrication these processes may include substrate growth, wafer slicing, epitaxial growth, masking, etching, and diffusion. Processing circuitry 11 includes a processor 12 coupled to storage circuitry 14 and display circuitry 16. Storage circuitry 14 may comprise a non-volatile memory device such as a static random access memory and display circuitry 16 may comprise a display device such as a cathode ray tube, television monitor, or printer. Processing circuitry 11 is coupled to multi-process environment 10 through interfacing circuitry 18. Though shown apart, interfacing circuitry 18 may be included as part of either processing circuitry 11 or multi-process environment 10.

Interfacing circuitry 18 gathers information regarding characteristics of multi-process environment 10. Multi-process environment 10 provides interfacing circuitry 18 with necessary information regarding materials and processes within the environment. An operator may also manually provide interface circuitry 18 with information relating to multi-process environment 10 as so desired. Interfacing circuitry 18 determines input parameters corresponding to characteristics of multi-process environment 10 and provides processing circuitry 11 with these input parameters. For wafer fabrication, these input parameters may include a maximum batch size, which is a maximum number of wafers that can be loaded in any one process; a time needed to execute each process; and a number of wafers to be processed for each process. Processor 12 of processing circuitry 11 determines an average batch size of a machine load using these input parameters, as programmed according to the preferred embodiment, through iterative calculations based on previous estimates of the average batch size. Upon generation of a final estimate of the average batch size, storage circuitry 14 stores the final estimate and display circuitry 16 displays the final estimate to the operator. Interfacing circuitry 18 reconfigures multi-process environment 10 in response to processor 12 based on the final estimate of the average batch size in order to optimize equipment for efficient operation of multi-process environment 10.

Figures 2, 3:
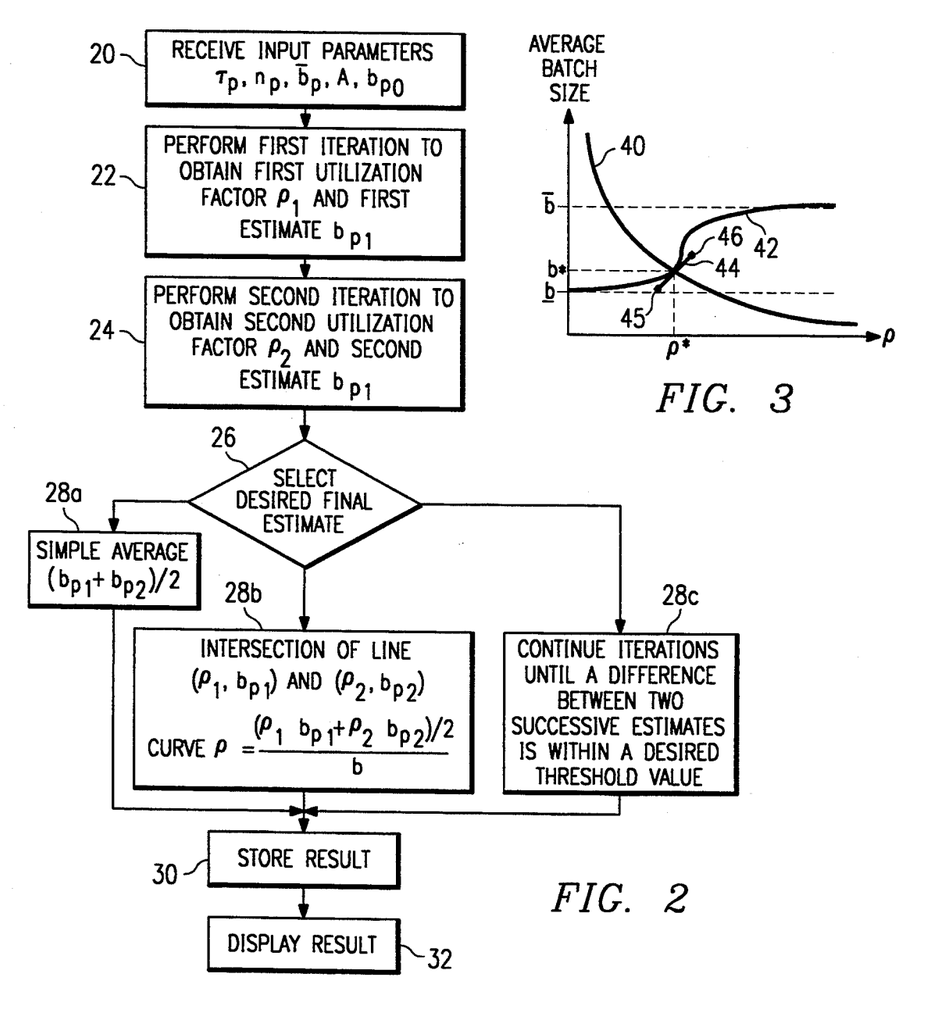
FIG. 2 is a program flow diagram implemented by the processing circuitry of the preferred embodiment.
FIG. 3 is a graph used to determine the average batch size of a machine load in the preferred embodiment.

FIG. 2 illustrates a program flow diagram for determining the average batch size performed by processing circuitry 11. Processor 12 receives input parameters from interface circuitry 18 at block 20. For an exemplary wafer fabrication setup, these input parameters preferably comprise a process time $\tau_p$ for each process p performed on the machine, a maximum number of wafers that can be loaded in any one process known as a maximum batch size $\overline{b_p}$, an amount of wafers to be processed $w_p$ for each process, available machine hours A within the multi-process environment 10, and an initial value $b_{p0}$ of the average batch size. The initial value $b_{p0}$ is an initial estimate of the average batch size necessary to begin the iteration runs. This value is preferably set at either zero or the maximum batch size $\overline{b_p}$.

These input parameters determine other parameters that characterize the manufacturing environment under scrutiny necessary to perform the iterative procedure. For instance, a total number of wafers processed in all processes performed is determined by adding all the wafers processed for each process as follows:

$$W = \sum_p w_p \quad (1)$$

Machine hours required to run all the processes on all the wafers is determined from the expression:

$$R = \sum_p \tau_p (w_p/b_p) \quad (2)$$

where $b_p$ is the average batch size to be determined by the iterative procedure. A total number of loads of wafers to process is determined from the expression:

$$B = \sum_p (w_p/b_p) \quad (3)$$

A utilization factor p is a function of the machine hours required R and the available machine hours A and is represented by the equation:

$$\rho = \frac{R}{A} \quad (4)$$

where A=shift hours x number of machines x uptime percentage of the machines.

Since the average batch size $b_p$ is the unknown in the above equations, an iterative analytical computation is performed based on the following equation: where $$b_{pi} = \frac{\{(1-\rho_i) + [\rho_i(1-\rho_i^{v_i})/(1-\rho_i)] - v_i(\rho_i^{v_i-1})\} W}{[(1-\rho_i) W/\overline{b_p} + (\rho_i - \rho_i^{v_i-1}) B_i]} \quad (5)$$

$$\rho_i = \frac{\sum_p \tau_p (w_p/b_{pi-1})}{A} \quad (6)$$

and $$v_i = 1 + \text{Ceil} (B_i \, \overline{b_p} + w_p) \quad (7)$$

with the Ceiling function meaning the next highest integer and $$B_i = \sum_p (w_p/b_{pi-1}) \quad (8)$$

Processing circuitry 11 performs a first iteration of equation 6 for i=1 at block 22. Using the initial estimate of the average batch size $b_{p0}$, this first iteration generates a first utilization factor $p_1$ which generates a first estimate of the average batch size $b_{p1}$ by applying the first utilization factor $p_1$ within equation (5). Program flow proceeds to block 24 where processing circuitry 11 performs a second iteration for i=2. For this second iteration, equations (5) and (6) apply the first estimate of the average batch size $b_{p1}$ to obtain a second utilization factor $p_2$ and a second estimate of the average batch size $b_{p2}$. After the second iteration completes, program flow proceeds to decision block 26.

Processing circuitry 11 generates a final estimate of the average batch size according to a selection made by the operator and received over interface circuitry 18. Processing circuitry 11 performs the final estimate according to the selection detected at block 26. Three optional final estimates are obtainable by processing circuitry 11. At block 28a, a simple average calculation generates a final estimate of the average batch size by averaging the first and second estimates of the average batch size from the earlier first and second iteration runs. At block 28c, the iterative procedure of equation (5) continues until a difference between two succeeding estimates of the average batch size is less than a desired threshold value. The most recent estimate at the time this threshold occurs becomes the final estimate of the average batch size. The simple average determination performed at block 28a is the easiest and crudest approximation of the average batch size. The continued iteration approach of block 28c provides an accurate approximation but is a more time consuming procedure.

The preferred final estimate of the average batch size arises at block 28b by finding the intersection of a straight line connecting the points $(p_1, b_{p1})$ and $(p_2, b_{p2})$ and the curve $p = C/b$ where $C = (p_1 b_{p1} + p_2 b_{p2})/2$. FIG. 3 illustrates a graph showing the intersection of the straight line and the curve. In FIG. 3, the curve 40 represents the equation $p = C/b$. This curve shows that as average batch sizes decrease, a large number of loads need to take place to complete the processes for all materials and thus the machines need to be utilized a greater proportion of time. Inversely, as average batch sizes increase fewer loads will be needed and the machines will be utilized a smaller proportion of time. S curve 42 represents a more realistic depiction of the relationship between the average batch size and the utilization factor. The S curve 42 illustrates the situation when utilization factor p is very small, the interarrival times between materials for machine loads will be very large relative to process times causing the average batch sizes to approach the available material on hand bwhich represents the smallest possible batch size. Further, as the utilization factor increases, the amount of material loaded in the machine increases until the maximum batch size $\overline{b}$ is reached. The average batch size is determined at the intersection of curve 40 and S curve 42. A straight line 44 having points 45 and 46, represented by $(p, b_{p1})$ and $(p_2, b_{p2})$ that are determined from the iteration steps at blocks 22 and 24 of FIG. 2, provides a close approximation of the S curve 42 along the point of intersection. The intersection of curve 40 and straight line 44 can be determined by known geometric calculations. The intersection approximation of block 28b provides a more accurate final estimate of the average batch size than the simple average determination of block 28a and is less time consuming than the continued iteration approach of block 28c.

Once a final estimate of the average batch size is determined, processing circuitry 11 proceeds to block 30 where the average batch size is stored in storage circuitry 14. The average batch size can be displayed by proceeding to block 32 wherein processing circuitry 11 displays the average batch size over display circuitry 16. Processing circuitry 11 can use this final estimate of the average batch size to reconfigure equipment in the manufacturing environment through interfacing circuitry 18 in order to optimize the effectiveness of the equipment. Bottlenecks can be detected and alleviated and changes in the manufacturing environment can be readily responded to by altering the input parameters to the system.

Attached hereto and forming a part of this specification is an Appendix A, comprising a source code listing, written in dbase with comments, depicting an implementation of a method in accordance with the preferred embodiment of the invention.

In summary, processing circuitry 11 determines an average batch size of a machine load by interfacing with a multi-process, multi-machine manufacturing environment. The average batch size establishes how equipment should be configured to alleviate bottlenecks and optimize manufacturing capabilities. A two level iterative procedure provides estimates of the average batch size. Three options are available to obtain a final estimate of the average batch size. The first option takes a simple average of the two estimates from the two level iterative procedure. The second option finds an intersection of a line and a curve formed by results of the two level iterative procedure. The third option is a continuation of the iterative procedure until a difference between successive estimates falls within a desired threshold value. The present invention avoids the more difficult and time consuming prior art approach of simulating the multi-process environment. Though the detailed description discussed above has identified the present invention with the manufacturing of semiconductor wafers, the invention may readily be applied to the manufacturing of other items, materials, and products.

Thus it is apparent that there has been provided, in accordance with the present invention, a method and system for determining an average batch size of a machine load in a multi-processing environment that satisfies the objects, aims, and advantages set forth above. Although the preferred embodiment has been described in detail, it should be understood that various changes, substitutions, and alterations can be made herein without departing from the spirit and scope of the invention as defined by the following claims.

APPENDIX A

```
****************************************************
&& WE NOW HAVE A NEW MACHINE ALLOCATION FOR THE MGs
(BASED && ON LOADS CORRESPONDING TO BSIs).  WE USE THIS
TO
&& CALCULATE BS2UTIL AND BS2s FOR ALL BATCH TASKS.
&& NOTE THAT WE ARE IN MACHGRP FILE AT THIS POINT WITH
&& FILTER SET TO TASKTYPE="E"
REPLACE ALL BS2UTIL WITH MIN(NETUTIL,.9999),;
```

```
        BS2BATLOAD WITH BATLOAD/MAX(1,NETUTIL/.9999),;
        BATLOAD WITH 0, TIMELOAD WITH 0
        && IF NETUTIL >=1 WE SET OUR UTILIZATION (BS2UTIL)
TO           .9999
        && IN ORDER TO ALLOW THIS, WE NEED TO REDUCE BATLOAD
           (BS2BATLOAD)
        && TO BATLOAD/FACTOR, WHERE
           FACTOR=MAX(1,NETUTIL/.9999).   THIS
        && ADJUSTS TIMELOAD TO TIMELOAD/FACTOR,
        && HENCE UTILIZATION IS NOW BROUGHT DOWN TO .9999
        && SETTING BATLOADS AND TIME LOADS TO 0 ABOVE IS
           INITIALIZATION
        && FOR NEXT ROUND OF BATCH SIZE CALCULATION
SET FILTER TO
SET ORDER TO MG
SELECT TASKSPEC
SET RELATION TO MG INTO MACHGRP
SET FILTER TO MACHGRP->TASKTYPE="B"
GOTO TOP
REPLACE ALL BS2 WITH CALCBS (MACHGRP-
>BS2UTIL,WAFLOAD,LOTLOAD,;
            MACHGRP->BS2BATLOAD,WAFMAXBS),;
    BSC WITH EXTRPLBS(BS1,BS2,MACHGRP->BS1UTIL,MACHGRP-
    >BS2UTIL,;
         MACHGRP->BS1BATLOAD,MACHGRP-
>BS2BATLOAD,MACHGRP-           >WAFLOAD),;
    BSCADJ WITH MIN(MAX(BSC, WAFLOAD/MAX(1,LOTLOAD)),
    WAFMAXBS),;
    TIMELOAD WITH WAFLOAD*PTIME/(60*MAX(BSCADJ,0.0001)),;
    MACHGRP->TIMELOAD WITH MACHGRP->TIMELOAD+TIMELOAD,;
    MACHGRP->BATLOAD WITH MACHGRP-
    >BATLOAD+(WAFLOAD/MAX(BSCADJ,0.0001))
        && DOSE MACHGR->BATLOAD IS NEEDED LATER? WE SHALL
        SEE
&& ONCE WE HAVE CALCULATED BS2 OUR SECOND STEP, GEETING
&& (BS2UTIL, BS2s) IS DONE. THE THIRD STEP, USING
&& (BS1UTIL, BS1) AND (BS2UTIL, BS2) TO CALCULATE BSC IS
&& DONE VIA FUNCTION EXTRPLBS.  WE ARE ALL DONE WITH
```

```
&& EXPECTED BATCH SIZE CALCULATION FOR EACH TASK.  WE
&& ADDITIONALLY CALCULATE TIMELOADS AT TASK LEVEL (FOR
&& FUTURE REPORTING AND ANALYSIS) AND CONSOLIDATE THEM
&& AT MG LEVEL TO CALCULATE A NEW AND LAST SET OF EFMACH
&& AND UTILIZATION FACTOR.
SET RELATION TO
SELECT MACHGRP
SET FILTER TO TASKTYPE="B"
GOTO TOP
REPLACE ALL NETUTIL WITH MIN(9999,
TIMELOAD/(USERUP*EFMACH*168)),EFMACH WITH 0;
        FOR EFMACH>0
                && REVISING NETUTIL (WITH TIMELOADS BASED ON
                     BSCADJ), 168=24HOURS*7DAYS
                && AND USING LATEST EFMACH (THE ONE USED TO
                     REVISE AND GET THE FINAL
                && BS2UTIL)
                && EFMACH IS REINITIALIZED TO 0 IN PREPARATION
OF                   LAST MACHINE
                && ALLOCATION TO EACH MG (BASED ON BSCADJ
                     UTILIZATIONS).
SET FILTER TO
SET ORDER TO MG
************************************************************
************************************************************
* FUNCTIONS AND PROCEDURES DEFINITIONS
************************************************************
* DEFINING FUNCTION:
* CALCBS (RHO,TWAFLOAD,TLOTLOAD,GBATLOAD, TWAFMAXBS)
FUNCTION CALCBS
PARAMETERS RHO,TWAFLOAD,TLOTLOAD,GBATLOAD, TWAFMAXBS
DO CASE
        CASE RHO<0 .OR. RHO>1
        RETURN "Call Darius"
        *
        CASE RHO=0      && BS IS DEFINED AS RHO->0: BS ->
        IF TLOTLOAD=0   && WAFLOAD/LOTLOAD.  BUT AT RHO=0 BS
        RETURN -9       && IS UNDEFINED.  WE LET THIS BE
```

```
        ELSE              && EQUAL TO -9 AS A SIGNAL. THE ONLY
        RETURN "Call Darius"  && WAY THIS COULD HAPPEN IS
        ENDIF             && WHEN WAFLOAD=LOTLOAD=0
    *
        CASE RHO=1
        RETURN(TWAFMAXBS)
    *
        OTHERWISE
        IF TLOTLOAD=0  && TLOTLOAD OR TWAFLOAD = 0 WHEN
        RETURN -8      && RHO>0 TASK IMPLIES THAT THIS TASK
                       && IS NOT USED. HENCE BS NOT         &&
DEFINED, WE SIGNAL WITH -8
        ELSE
        NBAR=1+CEILING(GBATLOAD*TWAFMAXBS/TWAFLOAD)
        TOPVAL=((1-RHO)+RHO*(((1-RHO**NBAR)/(1-RHO))-
NBAR*(RHO**(NBAR-1))))*TWAFLOAD
        BOTVAL=(1-RHO)*TLOTLOAD+(RHO-RHO**(NBAR-1))*GBATLOAD
        RETURN(TOPVAL/BOTVAL)
        ENDIF
ENDCASE
*END OF FUNCTION CALCBS
*************************************************************
* DEFINING FUNCTION:
* EXTRPLBS (FBS1,FBS2,FBS1UTIL,FBS2UTIL,FBS1BATLOAD,
      FBS2BATLOAD,FWAFLOAD)
FUNCTION EXTRPLBS
PARAMETERS FBS1,FBS2,FBS1UTIL,FBS2UTIL,FBS1BATLOAD,
      FBS2BATLOAD,FWAFLOAD
&& CALCULATING EXTRAPOLATION PARAMETER AA : SLOPE OF THE
      STRAIGHT LINE
&& DEFINED BY POINTS (BS1UTIL, BS1) & (BS2UTIL, BS2),
   I.E.     BS=AA*UTIL+BB
IF FBS1UTIL=FBS2UTIL
  IF FBS1UTIL>=.9998
  RETURN 9999999.9
  ELSE
  RETURN 0.5*(FBS1+FBS2)
  ENDIF
```

```
ELSE
 IF FBS1=FBS2
 RETURN FBS1
 ELSE
 AA=(FBS1-FBS2)/(FBS1UTIL-FBS2UTIL)
   IF AA<0
   RETURN 0.5*(FBS1+FBS2)
    ENDIF
  ENDIF
ENDIF
&& CALCULATING EXTRAPOLATION PARAMETER CC : THE CONSTANT
IN && THE INVERSE RELATION BS=CC/UTIL ESTIMATED VIA
AVERAGING && CC1=BS1*BS1UTIL AND CC2=BS2*BS2UTIL
IF FBS1BATLOAD=0 .OR. FBS2BATLOAD=0
RETURN "Call Darius"
ELSE
CC=0.5*((FBS1UTIL*FWAFLOAD/FBS1BATLOAD)+(FBS2UTIL*FWAFLOAD
/FBS2BATLOAD))
ENDIF
&& CALCULATING EXTRAPOLATION PARAMETER BB : SEE
      DOCUMENTATION FOR AA ABOVE
BB=FBS2-FBS2UTIL*AA
IF BB**2+(4*AA*CC)<0
RETURN "Call Darius"
ELSE
BSCUTIL= (-BB+SQRT(BB**2+(4*AA*CC)))*0.5/AA &&
INTERSECTION   OF BS=AA*UTIL+BB AND BS=CC/UTIL
ENDIF
*
IF BSCUTIL < 0 && CAN THIS BE TRUE AT ALL?
RETURN "Call Darius"
ELSE
RETURN AA*BSCUTIL+BB
ENDIF
*END OF FUNCTION EXTRPLBS
***********************************************************
* END OF FUNCTION DEFINITIONS
***********************************************************
```

What is claimed is:

1. A method for determining an average batch size using processing circuitry for reconfiguring a multi-process environment, comprising the steps of:

interfacing with said multi-process environment to determine input parameters corresponding to characteristics of said multi-process environment;

determining a first utilization factor from said input parameters;

determining a first estimate of the average batch size from said first utilization factor;

determining a second utilization factor and a second estimate of the average batch size from said first estimate;

determining a final estimate of the average batch size using said first and second estimate; and reconfiguring the multi-process environment based on said final estimate of the average batch size.

2. The method of claim 1, wherein the step of determining said final estimate of the average batch size comprises averaging said first and second estimates.

3. The method of claim 1, wherein the step of determining said final estimate of the average batch size comprises finding an intersection of a line and a curve established by said first and second utilization factors and said first and second estimates.

4. The method of claim 1, wherein the step of determining said final estimate of the average batch size comprises determining subsequent utilization factors and subsequent estimates of the average batch size until a difference between two succeeding estimates is less than a desired threshold value.

5. The method of claim 1, wherein said input parameters include an amount of material to be processed for each process, available machine hours, an initial estimate of the average batch size, a process time for each process, and a maximum batch size.

6. The method of claim 1, wherein said utilization factors are determined according to an expression:

$$\rho_i = \frac{\sum_p \tau_p (w_p/b_{pi-1})}{A}$$

where $\rho_i$ represents said utilization factors;

$\tau_p$ represents a process time for each process;

$w_p$ represents an amount of material to be processed for each process;

$b_{pi-1}$ represents an estimate of the average batch size;

A represents available machine hours; and i represents an iteration number, wherein said first utilization factor is determined at i=1 and said second utilization factor is determined at i=2.

7. The method of claim 1 wherein said first and second estimates of the average batch size are determined through iterations of an equation:

$$b_{pi} = \frac{\{(1-\rho_i) + [\rho_i(1-\rho_i^{v_i})/(1-\rho_i)] - v_i(\rho_i^{v_i-1})\} W}{[(1-\rho_i) W/\overline{b_p} + (\rho_i - \rho_i^{v_i-1}) B_i]}$$

where $b_{pi}$ represents said estimates;

$\rho_i$ represents said utilization factors;

$B_i$ represents a number of machine loads $$\sum_p (w_p/b_{pi-1});$$

$w_p$ represents an amount of material to be processed for each process;

$v_i$ is represented by $1 + \text{Ceil}(B_i\overline{b_p}/w_p)$, the Ceiling function meaning the next highest integer;

$\overline{b_p}$ represents a maximum batch size;

$b_{pi-1}$ represents an estimate of the average batch size;

W represents a total amount of material of all processes $$\sum_p w_p;$$

and i represents an iteration number, wherein said first estimate is determined at i=1 and said second estimate is determined at i=2.

8. A method for determining an average batch size using processing circuitry for reconfiguring a multi-process environment, comprising the steps of:

interfacing with a multi-process environment to determine input parameters corresponding to characteristics of said multi-process environment, said input parameters include a process time, a maximum batch size, and an amount of material to be processed for each process, available machine hours, and an initial estimate of the average batch size;

performing a first iteration to determine a first utilization factor from said input parameters according to a first expression:

$$\rho_i = \frac{\sum_p \tau_p (w_p/b_{pi-1})}{A}$$

where $\rho_i$ represents said utilization factors;

$\tau_p$ represents said process time;

$w_p$ represents said amount of material;

$b_{pi-1}$ represents an estimate of the average batch size;

A represents said available machine hours;

i represents an iteration number, wherein said first utilization factor is determined at i=1;

and a first estimate of the average batch size according to a second expression:

$$b_{pi} = \frac{\{(1-\rho_i) + [\rho_i(1-\rho_i^{v_i})/(1-\rho_i)] - v_i(\rho_i^{v_i-1})\} W}{[(1-\rho_i) W/\overline{b_p} + (\rho_i - \rho_i^{v_i-1}) B_i]}$$

where $b_{p1}$ represents said first estimate;

$\rho_i$ represents said utilization factor;

$B_i$ represents a number of machine loads $$\sum_p (w_p/b_{pi-1});$$

$w_p$ represents said amount of material;

$v_i$ is represented by $1 + \text{Ceil}(B_i\overline{b_p}/w_p)$, the Ceiling function meaning the next highest integer;

$\overline{b_p}$ represents said maximum batch size;

$b_{pi-1}$ represents an estimate of the average batch size;

w represents a total amount of material of all processes $$\sum_p w_p,$$

wherein said first estimate is determined at i=1;
performing a second iteration for i=2 to determine a second utilization factor and a second estimate of the average batch size from said first estimate according to said first and second expressions;
determining a final estimate of the average batch size using said first and second estimate; and
reconfiguring the multi-process environment based on said final estimate of the average batch size.

9. The method of claim 8, wherein the step of determining said final estimate of the average batch size comprises averaging said first and second estimates.

10. The method of claim 8, wherein the step of determining said final estimate of the average batch size comprises finding an intersection of a line and a curve established by said first and second utilization factors and said first and second estimates.

11. The method of claim 8, wherein the step of: determining said final estimate of the average batch size comprises determining subsequent utilization factors and subsequent estimates of the average batch size until a difference between two succeeding estimates is less than a desired threshold value.

12. A system for determining an average batch size for reconfiguring a multi-process environment, comprising:
interfacing circuitry coupled to said multi-process environment for determining input parameters corresponding to characteristics of said multi-process environment;
processing circuitry coupled to said interfacing circuitry for determining a first utilization factor from said input parameters, a first estimate of the average batch size from said first utilization factor, a second utilization factor from said first estimate, and a second estimate of the average batch size from said second utilization factor, said processing circuitry responsive to said first and second estimate for determining a final estimate of the average batch size; and
said processing circuitry reconfiguring said multi-process environment through said interfacing circuitry based on said final estimate of the average batch size.

13. The system of claim 12, wherein said processing circuitry determines said first and second utilization factors according to an expression:

$$\rho_i = \frac{\sum_p \tau_p (w_p/b_{pi-1})}{A}$$

where
$\rho_i$ represents said utilization factors;
$\tau_p$ represents a process time for each process;
$w_p$ represents an amount of material to be processed for each process;
$b_{pi-1}$ represents an estimate of the average batch size;
A represents available machine hours; and
i represents an iteration number, wherein said first utilization factor is determined at i=1 and said second utilization factor is determined at i=2.

14. The system of claim 12, wherein said processing circuitry determines said first and second estimates according to an expression:

$$b_{pi} = \frac{\{(1 - \rho_i) + [\rho_i(1 - \rho_i^{v_i})/(1 - \rho_i)] - v_i(\rho_i^{v_i-1})\} W}{[(1 - \rho_i) W/\overline{b}_p + (\rho_i - \rho_i^{v_i-1}) B_i]}$$

where
$b_{pi}$ represents said estimates;
$\rho_i$ represents said utilization factor;
$B_i$ represents a number of machine loads $$\sum_p (w_p/b_{pi-1});$$

$w_p$ represents an amount of material to be processed for each process;
$v_i$ is represented by $1+\text{Ceil}(B_i\overline{b}_p/w_p)$, the Ceiling function meaning the next highest integer;
$\overline{b}_p$ represents a maximum batch size;
$b_{pi-1}$ represents an estimate of the average batch size;
W represents a total amount of material of all processes $$\sum_p w_p;$$

and
i represents an iteration number, wherein said first estimate is determined at i=1 and said second estimate is determined at i=2.

15. The system of claim 12, wherein said processing circuitry determines said final estimate of the average batch size by averaging said first and second estimates.

16. The system of claim 12, wherein said processing circuitry determines said final estimate of the average batch size by finding an intersection of a line and a curve established by said first and second utilization factors and said first and second estimates.

17. The system of claim 12, wherein said processing circuitry determines said final estimate of the average batch size by determining subsequent utilization factors and subsequent estimates of the average batch size until a difference between two succeeding estimates falls below a desired threshold value.

18. A method for determining an average batch size using processing circuitry, comprising the steps of:
interfacing with a multi-process environment to determine input parameters corresponding to characteristics of said multi-process environment;
determining a first utilization factor from said input parameters;
determining a first estimate of the average batch size from said first utilization factor;
determining a second utilization factor and a second estimate of the average batch size from said first estimate;
determining a final estimate of the average batch size by finding an intersection of a line and a curve established by said first and second utilization factors and said first and second estimates; and
reconfiguring the multi-process environment based on a final estimate of said average batch size.

* * * * *